United States Patent
Kawai

(10) Patent No.: US 8,245,537 B2
(45) Date of Patent: Aug. 21, 2012

(54) MOLD FOR GLASS SUBSTRATE MOLDING, METHOD FOR PRODUCING GLASS SUBSTRATE, METHOD FOR PRODUCING GLASS SUBSTRATE FOR INFORMATION RECORDING MEDIUM, AND METHOD FOR PRODUCING INFORMATION RECORDING MEDIUM

(75) Inventor: Hideki Kawai, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 381 days.

(21) Appl. No.: 12/448,931

(22) PCT Filed: Dec. 26, 2007

(86) PCT No.: PCT/JP2007/074924
§ 371 (c)(1),
(2), (4) Date: Jul. 14, 2009

(87) PCT Pub. No.: WO2008/087837
PCT Pub. Date: Jul. 24, 2008

(65) Prior Publication Data
US 2010/0071416 A1    Mar. 25, 2010

(30) Foreign Application Priority Data
Jan. 16, 2007  (JP) ................. 2007-006913

(51) Int. Cl.
*C03B 11/00* (2006.01)
*C03B 11/08* (2006.01)
(52) U.S. Cl. .... 65/66; 65/374.11; 65/374.12; 65/374.13
(58) Field of Classification Search .......... None
See application file for complete search history.

(56) References Cited

U.S. PATENT DOCUMENTS
6,151,917 A * 11/2000 Hibino et al. .......... 65/169

FOREIGN PATENT DOCUMENTS
| JP | 9-328322 A | 12/1997 |
| JP | 10-194763 | 7/1998 |
| JP | 2004-21077 A | 1/2004 |
| JP | 2007-99598 A | 4/2007 |
| WO | WO 2008/087837 A1 | 7/2008 |

OTHER PUBLICATIONS

Machine Translation of JP2007-099598.*
Machine Translation of JP10-194763.*
International Search Report in International Application No. PCT/JP2007/074924, dated Apr. 8, 2008, 2 pages.

* cited by examiner

*Primary Examiner* — Matthew Daniels
*Assistant Examiner* — Lisa Herring
(74) *Attorney, Agent, or Firm* — Brinks Hofer Gilson & Lione

(57) ABSTRACT

Disclosed is a mold for glass substrate molding, which enables to produce a glass substrate having high flatness by a method for producing a glass substrate through press molding of molten glass. Also disclosed is a method for producing a glass substrate by using such a mold. Specifically disclosed is a mold comprising a lower mold having a first molding surface for pressing a molten glass supplied thereto, and an upper mold having a second molding surface for pressing the molten glass against the first molding surface. In the first molding surface, the surface roughness Ra of the peripheral portion which is in contact with the molten glass after pressing is higher than the surface roughness Ra of the central portion which is in contact with the molten glass before pressing.

9 Claims, 6 Drawing Sheets

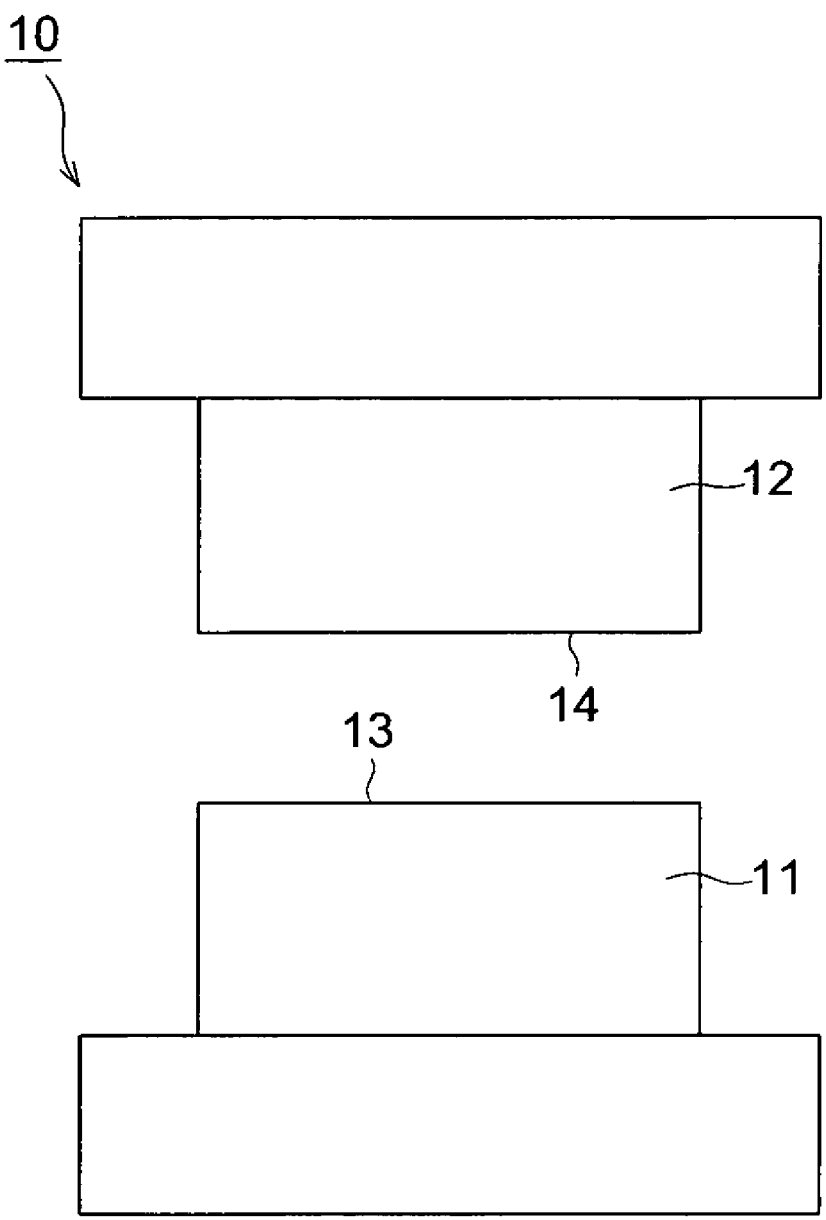

MOLD FOR GLASS SUBSTRATE MOLDING, METHOD FOR PRODUCING GLASS SUBSTRATE, METHOD FOR PRODUCING GLASS SUBSTRATE FOR INFORMATION RECORDING MEDIUM, AND METHOD FOR PRODUCING INFORMATION RECORDING MEDIUM

This application is a U.S. National Phase Application under 35 USC 371 of International Application PCT/JP2007/074924 filed Dec. 26, 2007.

TECHNICAL FIELD

The present invention relates to a mold for molding a glass substrate, a producing method of a glass substrate by the use of the mold for molding, a producing method of a glass substrate for an information recording medium by the use of the glass substrate produced by the producing method and a producing method of an information recording medium.

BACKGROUND ART

Among information recording mediums having a recording layer utilizing the property of magnetism, light and magneto-optics, there is a magnetic disk as a typical one. Conventionally, as a substrate for a magnetic disk, an aluminum substrate has been widely used. However, recently, in accordance with a request to reduce an amount of float-up of a magnetic head in order to increase a recording density, the ratio of employing a glass substrate as a substrate for a magnetic disk increases due to the reason that since the glass substrate is excellent in surface flatness in comparison with the aluminum substrate and has few surface defects, an amount of float-up of a magnetic head can be reduced by the use of the glass substrate.

Such a glass substrate for an information recording medium like a magnetic disk is produced by a step of applying a polishing process on a glass substrate called a blank material. As a method of producing a glass substrate (a blank material), a method of producing a glass substrate by pressing shaping a molten glass and a method of producing a glass substrate by cutting a glass plate produced by a float method are well known. Among these methods, a method of producing a glass substrate by directly pressing shaping a molten glass has received specifically a lot of attention, because high productivity is expected from this method.

However, in the method of producing a glass substrate by pressing shaping a molten glass, since the flatness of a produced glass substrate is bad, it is necessary to conduct an annealing process in order to correct the flatness. Therefore, there is a problem to need a lot of time and labor for a post processing.

In order to improve the deterioration of a flatness due to a warp of a glass substrate, a pressing shaping method is proposed to employ a mold in which a receiving mold, or a opposing mold or at least a part of a shaping surface of a receiving mold or a opposing mold is subjected to a heat insulation processing (refer, for example, Patent document 1). Further, as the heat insulation processing, Patent document 1 proposes a method of making a shaping surface to a rough surface.

Patent document 1: an official report of Japanese Patent Unexamined Publication No. 10-194763

DISCLOSURE OF THE INVENTION

Problem to be Solved by the Invention

However, according to an experiment by the present inventor, it turned out that even if employing a mold in which a pressing surface of an upper mold and a pressing surface of a lower mold are made to a rough surface according to the disclosure of Patent document 1, an amount of a warp of a glass substrate is almost not reduced and a flatness is not improved.

As a result of intensive studies repeated by the present inventor, it turned out that the deterioration of the flatness of a glass substrate produced by a pressing shaping process of a molten glass is caused by variations in the solidifying timing of the molten glass due to a difference in a cooling rate between a central portion and a peripheral portion in the molten glass (glass substrate) in the pressing shaping process. Namely, a central portion of a molten glass firstly comes in contact with a lower mold so that the central portion is cooled and solidified on ahead. On the other hand, a peripheral portion comes subsequently in contact with the lower mold so that the peripheral portion is cooled and solidified lately. Therefore, when the peripheral portion is solidified, heat shrinkage takes places. As a result, the flatness of a resultant glass substrate becomes deteriorated. Even if employing a mold in which a pressing surface of an upper mold and a pressing surface of a lower mold are made to a rough surface in accordance with the description of Patent document 1, since there is no effect to reduce a difference in a cooling rate between a central portion and a peripheral portion in a molten glass, a problem of a warp of a glass substrate after being molded has not been solved yet.

The present invention has been made in view of the above-mentioned technical problems, and an object of the present invention is to provide a glass substrate shaping mold capable of producing a glass substrate having a high flatness with a method of producing a glass substrate by pressing shaping a molten glass, a glass substrate producing method employing the mold, a producing method of a glass substrate for an information recording medium by using a glass substrate produced by the glass substrate producing method, and a producing method of an information recording medium.

Means for Solving the Problem

In order to solve the above problems, the present invention has the following features.

1. In a mold for shaping a glass substrate for producing a glass substrate by pressing shaping a molten glass, the mold for shaping a glass substrate is characterized by comprising:

a lower mold to which the molten glass is supplied and the lower mold provided with a first shaping surface to press the supplied molten glass; and an upper mold provided with a second shaping surface to press the molten glass with the fist shaping surface therebetween;

wherein on the first shaping surface, the surface roughness of a peripheral section adapted to come in contact with the molten glass for the first time after pressing is made larger than the surface roughness of a central section adapted to come in contact with the supplied molten glass before pressing.

2. The mold for shaping a glass substrate described in the above 1 and characterized in that the surface roughness of the central section is 0.05 to 3.00 μm and the surface roughness of the peripheral section is 0.07 to 10.00 μm.

3. The mold for shaping a glass substrate described in the above 1 or 2 and characterized in that the surface roughness of the peripheral section is 1.5 times or more and 20 times or less of the surface roughness of the central section.

4. In a glass substrate producing method for producing a glass substrate by pressing shaping a molten glass, the glass substrate producing method is characterized by comprising:

a molten glass supplying process for supplying a molten glass to a first shaping surface formed on a lower mold, and a pressing process for cooling the molten glass supplied onto the first shaping surface while pressing the molten glass between the first shaping surface and a second shaping surface formed on an upper mold so as to obtain a glass substrate;

wherein on the first shaping surface, the surface roughness of a peripheral section adapted to come in contact with the molten glass for the first time after pressing is made larger than the surface roughness of a central section adapted to come in contact with the supplied molten glass before pressing.

5. The glass substrate producing method described in the above 4 and characterized in that the surface roughness of the central section is 0.05 to 3.00 μm and the surface roughness of the peripheral section is 0.07 to 10.00 μm.

6. The glass substrate producing method described in the above 4 and characterized in that the surface roughness of the peripheral section is 1.5 times or more and 20 times or less of the surface roughness of the central section.

7. The glass substrate producing method described in any one of the above 4 to 6 and characterized in that the glass substrate is a glass substrate for producing a glass substrate for an information recording medium.

8. A producing method of producing a glass substrate for an information recording medium characterized by comprising:

a polishing process of polishing a glass substrate produced by the glass substrate producing method described in the above 7.

9. A producing method of producing an information recording medium characterized by comprising:

a forming process of forming a recording layer on a glass substrate for an information recording medium produced by the producing method of producing a glass substrate for an information recording medium described in the above 8.

Effect of the Invention

According to the present invention, a cooling rate at a peripheral section of a first shaping surface can be increased, whereby a solidifying timing can be equalized all over the whole surface of a molten glass. Therefore, in a method of producing a glass substrate by pressing shaping a molten glass, it becomes possible to produce a glass substrate with a high flatness.

BRIEF DESCRIPTION OF THE DRAWING

FIG. 1 is a diagram explaining an example of a mold for producing a glass substrate;

EXPLANATION OF SYMBOL

Figure 2A:
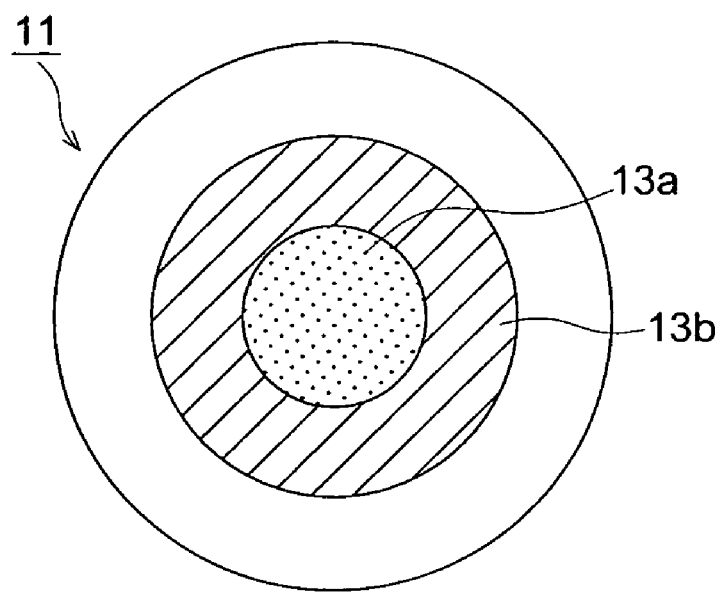
FIGS. 2a and 2b show respectively a plan and a perspective schematic diagram of a lower mold 11.

| 10 | mold for shaping a glass substrate |
|---|---|
| 11 | lower mold |
| 12 | upper mold |
| 13 | first shaping surface |
| 13a | central section of the first shaping surface |
| 13b | peripheral section of the first shaping surface |
| 14 | second shaping surface |
| 23 | molten glass |
| 24 | glass substrate |
| 30 | glass substrate for an information recording medium |

BEST MODE FOR CARRYING OUT THE INVENTION

Hereafter, an embodiment of the present invention will be explained in detail with reference to drawings.

(Mold for Shaping a Glass Substrate)

FIG. 1 is a sectional view showing an example of a glass substrate shaping mold of the present invention. The glass substrate shaping mold 10 comprises a lower mold 11 provided with a first shaping surface 13 to press a supplied molten glass and an upper mold 12 provided with a second shaping surface 14 to press the molten glass between itself and the first shaping surface 13 of the lower mold 11.

Figure 2B:
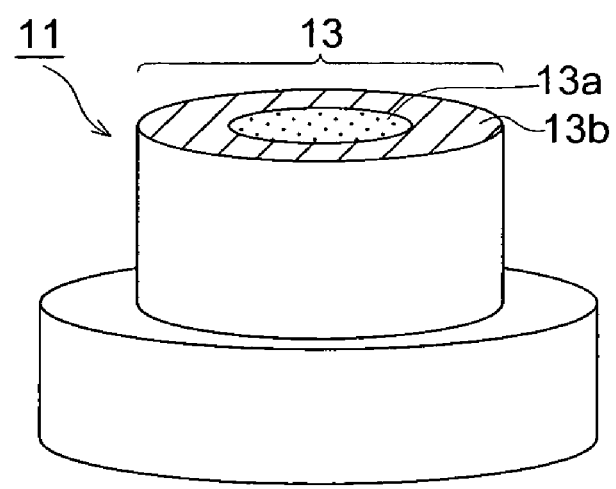

FIG. 2 is a schematic diagram of the lower mold 11, and FIG. 2(a) is a plan view viewed from a upper side and FIG. 2(b) is a perspective diagram. On the first shaping surface 13 of the lower mold 11, a central section 13a is adapted to come in contact with a molten glass before the molten glass is pressed and a peripheral section 13b is adapted to come in contact with the molten glass for the first time after the molten glass has been pressed, and the surface roughness Ra of the peripheral section 13b is made larger than that of the central section 13a. Therefore, since the cooling rate of the molten glass at the peripheral section 13b can be increased, the solidified timing of the molten glass is equalized over the whole surface of the molten glass, whereby a glass substrate having a high flatness can be produced.

Here, the reason why the flatness of a glass substrate can be increased by a technique of making the surface roughness Ra of the peripheral section 13b of the first shaping surface 13 larger than the surface roughness Ra of the central part 13a is explained. In a method of producing a glass substrate by pressing shaping a molten glass, the temperature of a mold is maintained at a prescribed temperature and a hot molten glass with a temperature higher than that of the mold is supplied to the mold. The hot molten glass deforms while being pressed between the upper and lower molds and simultaneously releases heat, and then, the molten glass is cooled and solidified, whereby a glass substrate is formed. At this time, the large portion of heat release is performed by the contact surface with the mold.

When a molten glass is supplied to the first shaping surface 13 of the lower mold 11, the molten glass is brought firstly in contact with the central section 13a of the first shaping surface 13, and cooling starts. Thereafter, a peripheral portion of the molten glass expanded by being pressed is brought in contact with the peripheral section 13b of the first shaping surface 13 for the first time after having been pressed. Therefore, a difference of temperature is caused between the central portion and the peripheral portion of the molten glass.

Figure 3A:
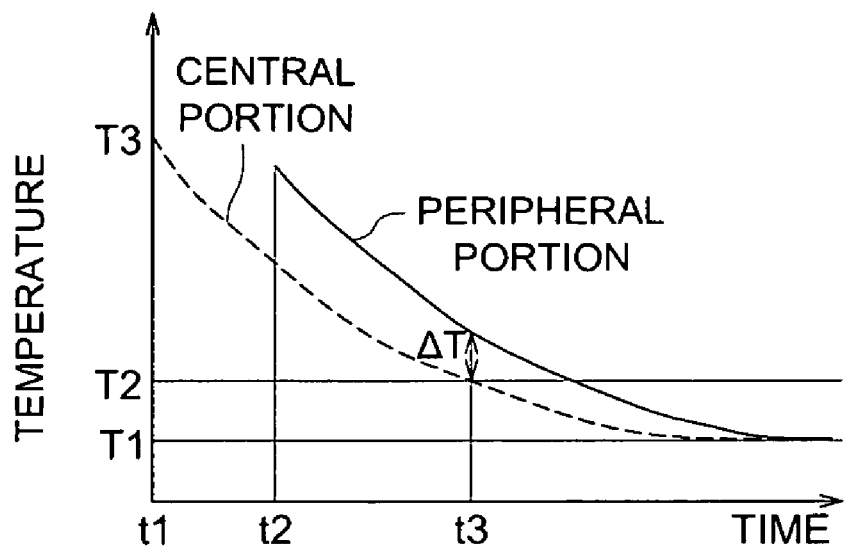
FIGS. 3a and 3b are graphs showing schematically a temperature change at a central portion and a peripheral portion in a molten glass supplied in a mold.

FIG. 3 is a graph which shows schematically a temperature change of each of a central portion (a portion being brought in contact with the central section 13a of the first shaping surface 13) and a peripheral portion (a portion being brought in contact with the peripheral section 13b of the first shaping surface 13) of a molten glass supplied to the mold. FIG. 3(a) shows a graph in the case of using a conventionally known lower mold in which the surface roughness of a first shaping surface is uniform over the whole surface, and FIG. 3 (b) is a graph in the case of using the glass substrate shaping mold 10 of the present invention. Among the graphs, a dotted line shows the temperature change of the central portion of a molten glass, and a solid line shows the temperature change of the peripheral portion of the molten glass.

The axis of abscissas of the graphs represents time. The symbol t1 represents a time at the time that a molten glass is supplied to the first shaping surface 13 of the lower mold 11, the symbol t2 represents a time at the time point that the molten glass is brought in contact with the peripheral section 13b of the shaping surface 13 by being pressed, and the symbol t3 represents a time at the time point that the temperature of a central portion of the molten glass becomes T2.

Here, the viscosity of glass originally increases continuously with the lowering of temperature. Therefore, the solidification temperature T2 of glass cannot be strictly determined to one point, and it should be considered that the solidification temperature T2 becomes a temperature range with a certain width. However, since the size of the width seldom causes a problem here, an explanation is made with a simplified model in which the width is disregarded. The temperature T2 in this case can be considered as a temperature near a glass transition point (Tg).

In the case that the conventional mold is used, as shown in FIG. 3(a), when a molten glass is supplied, cooling is started by heat release from the first shaping surface 13 of the lower mold 11. Therefore, cooling for a central portion (dotted line) of a molten glass is started immediately from the time point (t1) when the molten glass is supplied to the first shaping surface 13, the central portion is cooled at the time point of t3 to the temperature T2 at which glass solidifies, and eventually the temperature of the central portion becomes close to the temperature T1 of the lower mold 11. On the other hand, cooling for a peripheral portion (solid line) of the molten glass is started late from the central portion at the time point t2 when the molten glass is brought in contact with the peripheral section 13b of the first shaping surface 13, and eventually the temperature of the peripheral portion becomes close to the temperature T1 of the lower mold 11.

Here, a problem is a difference of temperature (ΔT) between the central portion and the peripheral portion at the time point (t3) when the temperature of the central portion of the molten glass becomes T2. During a period until the temperature of each of the central and peripheral portions finally becomes close to the temperature T1 of the lower mold 11, an amount of thermal contraction of the peripheral portion of a molten glass becomes larger than the central portion by an amount corresponding to the difference of temperature (ΔT). If the molten glass is in the situation before solidification, even if an amount of thermal contraction is different between the central and peripheral portions due to a differences of temperature, since distortion is canceled by the flowing of glass, the difference of temperature (ΔT) will not become a problem. However, since glass cannot flow after the temperature of the central portion has become T2, a difference of amount of thermal contraction cannot be canceled. Therefore, the flatness of a glass substrate gets worse.

Figure 3B:
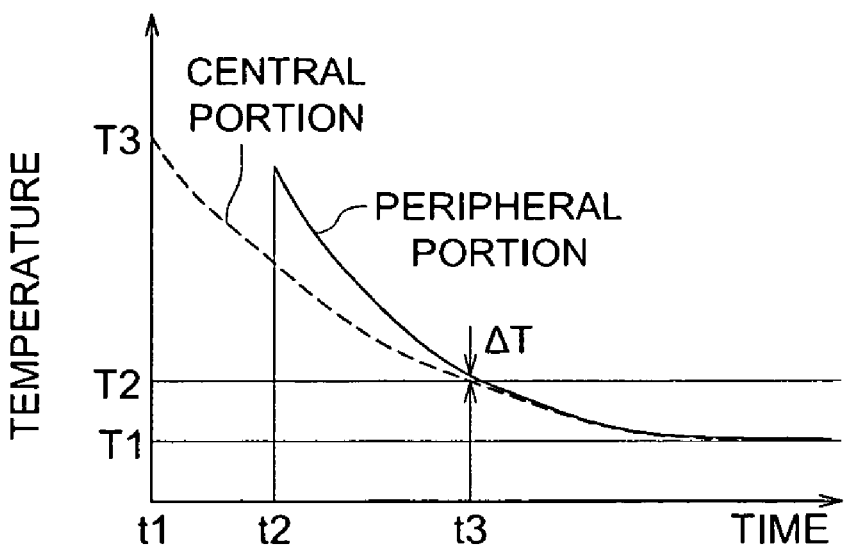

On the other hand, in the glass substrate shaping mold 10 of the present invention, the surface roughness Ra of the peripheral section 13b of the first shaping surface 13 is made larger than the surface roughness Ra of the central section 13a. Therefore, at the time of coming in contact with a molten glass, the effective contact surface area of the peripheral section 13b becomes larger than the central section 13a, and the heat releasing rate of the molten glass becomes higher at the peripheral section 13b. Therefore, as shown in FIG. 3(b), the cooling rate of a molten glass on the peripheral section becomes faster than the cooling rate on the central section. As a result, at the time point (t3) when the temperature of the central section of the molten glass becomes T2, a difference of temperature (ΔT) between the central and peripheral sections can be made small corresponding to the faster cooling rate. Whereby, a difference of amount of thermal contraction between the central and peripheral sections can be made small, and then a glass substrate having a high flatness can be obtained.

As mentioned above, with the structure that the surface roughness Ra of the peripheral section 13b of the first shaping surface 13 is made larger than the surface roughness Ra of the central section 13a, the effect to improve the flatness of a glass substrate can be acquired. Further, with the structure that the surface roughness Ra of the peripheral section 13b of the first shaping surface 13 is made larger than the surface roughness Ra of the central section 13a, the surface roughness Ra of the central section 13a is made within a range of from 0.05 to 3.00 μm and the surface roughness Ra of the peripheral section 13b is made within a range of from 0.07 to 10.00 μm, the flatness of a glass substrate can be improved more. More preferably, the surface roughness Ra of the central section 13a is made within a range of from 0.08 to 2.00 μm and the surface roughness Ra of the peripheral section 13b is made within a range of from 0.1 to 8.00 μm. Still more preferably, the surface roughness Ra of the central section 13a is made within a range of from 0.1 to 1.50 μm and the surface roughness Ra of the peripheral section 13b is made within a range of from 0.12 to 5.00 μm. If the surface roughness Ra of the central section 13a is smaller than 0.05 μm, the reactivity with a molten glass becomes too high. As a result, since the separating ability between glass and a mold is lowered, it is not desirable in the aspect of attaining good flatness. On the other hand, if the surface roughness Ra of the central section 13a is larger than 3.00 μm, the influence of concavo-convex of the surface becomes strong. Therefore, when a hot liquid glass is brought in contact with the surface, an anchor effect by the concavo-convex of the surface occurs, and the hot liquid glass is caught up by the concavo-convex of the surface. As a result, since glass cannot be separated clearly from a mold, surface defects, such as scratch, chip off, and crack are apt to take place. Accordingly, it is not desirable. Furthermore, if the surface roughness Ra of the peripheral section 13b is smaller than 0.07 μm, since the effect to increase a heat releasing rate by enlarging an effective surface area coming in contact with a molten glass becomes small. Accordingly, it is not desirable. On the other hand, if the surface roughness Ra of the peripheral section 13b is larger than 10 μm, the deterioration of a mold due to oxidation and a reaction with a molten glass becomes conspicuous. Accordingly, it is not desirable. Moreover, with the structure that the surface roughness Ra of the peripheral section 13b of the first shaping surface 13 is made 1.5 or more times of the surface roughness Ra of the central section 13a, the flatness of a glass substrate can be further improved. On the other hand, if the surface roughness Ra of the peripheral section 13b of the first shaping surface 13 is made more than 20 times of the surface roughness Ra of the central section 13a, a cooling rate at a peripheral section of a molten glass becomes too fast, and then the flatness of a glass substrate may get worse on the contrary. Therefore, in order to obtain a glass substrate having a high flatness, it is desirable to make the surface roughness Ra of the peripheral section 13b of the first shaping surface 13 1.5 or more times and 20 or less times of the surface roughness Ra of the central section 13a.

Here, the surface roughness Ra means an arithmetic mean height Ra specified by JIS B0601: 2001. The surface roughness Ra can be measured by the use of a commercially available sensing needle type surface roughness measurement device and the like.

There is no specific restriction on the position of the boundary between the peripheral section 13b and the central section 13a on the first shaping surface 13, and it may be permissible if a region coming in contact with a molten glass before the starting of a pressing process is the central section 13a and a region coming in contact with the molten glass for the first time after the starting of the pressing process is the peripheral section 13b. The diameter of the boundary may be set appropriately in accordance with a supply amount and a supply condition of a molten glass and the size of a glass substrate to be produced. In order to obtain a glass substrate having a high flatness by maintaining the balance of heat release, it is desirable to make the diameter of the boundary between the peripheral section 13b and the central section 13a 0.3 times to 0.7 times of the diameter of a glass substrate to be produced.

A material used for a glass substrate shaping mold may be a material having a heat releasing action, however, it is preferably a material having a high heat resistance property, a low corrosive property (reactivity with glass), and a good heat conductance. If the heat conductance of a mold being in contact with a molten glass is low, a cooling action for the molten glass becomes insufficient, and the solidification of the molten glass does not progress smoothly. As a result, a long shaping time is needed. Further, if a time period during a mold being contact with a molten glass on a high temperature condition becomes long, the mold reacts with the molten glass. As a result, since it becomes difficult to separate the glass from the mold, a flatness gets worse at the time of separation after the pressing shaping process. The heat conductance (W/mk) of a mold is preferably 10 or more, more preferably 25 or more, and still more preferably 15 or more.

Specific examples of materials of a mold include the following materials. Here, heat conductance (W/mk) is indicated in a parenthesis.

Cast metal (60-100)
Carbon steel (50)
Heat resistance stainless steel
  Austenite type: SUS302B (16), SUS309B (15), SUS309S (14), SUS310S (14), SUS316 (14), and SUS316L (16); Ferrite type: SUS430 (26), SUS436L (25), and SUS444 (25);
  Martensite type: SUS403 (25), SUS431 (20), SUS440A (24), SUS440B (24), SUS440C (24); and
  Others: SUH660 (15)
Heat resistance special steel (except a stainless steel type)
Inconel: 600, 617 and 625, 686, 690, 718 (15), 751 (14)
Hastelloy: HB, HC
Anviloy (130)
Colmonoy/Ni base alloy: 4, 6, 22, 56
Ultrahard material (30-75) containing tungsten carbide (WC) as a principal component
Ceramic material
  Silicon carbide (75)
  Silicon nitride (25)
  Aluminium nitride (170)
  Alumina (38)
  Zirconia (3)
  Mullite (2)
  Cordierite (2)
  Petalite (2)
Carbon type material
  Glassy carbon (6)
  Carbon ceramics (67)

As specifically preferable materials, the following materials can be employed.

Martensite type heat resistance stainless steel Heat resistance special steel (Inconel, Anviloy)
Super hard steel containing tungsten carbide (WC) as a principal component
Carbon ceramic
Carbon steel The above materials may be used solely, or may be mixed or laminated as a composite material. Further, the lower mold 11 and the upper mold 12 may be constituted with the same material, or may be constituted with respective different materials.

In order to make the surface roughness Ra of the peripheral section 13b of the first shaping surface 13 larger than the surface roughness Ra of the central section 13a, it may be permissible to set up suitably the conditions of a polishing process or a grinding process at the time of producing a mold. Further, it may be permissible that after the both surfaces have been finished with the same surface roughness, the peripheral section 13b of the first shaping surface 13 is made rough with a blasting process or an etching process. The roughing process may be conducted by an oxidation treatment with heating in the atmosphere. Further, in the case that a protective layer is formed on the first shaping surface 13, a foundation surface is firstly made to a rough surface, and then a protective layer may be formed on the roughed foundation surface. Alternately, a protective layer is firstly formed, and then the protective layer is made to a rough surface.

Here, the glass substrate shaping mold of the present invention may be a mold which employs a single upper mold 12 and a single lower mold 11 as a set, or a mold in which one or both of the upper mold 12 and the lower mold 11 is split into plural molds. For example, the glass substrate shaping mold is a mold employing a: single upper mold 12 and two or more lower molds 11 as a set or a mold employing two or more upper molds 12 and two or more lower molds 11 as a set.

(Producing Method of a Glass Substrate)

The glass substrate producing method of the present invention is a method of producing a glass substrate by pressing shaping a molten glass, and comprises a molten glass supplying process of supplying a molten glass to a first shaping surface 13 formed on a lower mold 11, and a pressing process of cooling the molten glass supplied to the first shaping surface 13 while pressing the molten glass between the first shaping surface 13 and a second shaping surface 14 formed on an upper mold 12, whereby a glass substrate is obtained. As a mold, employed is a mold 10 comprising a lower mold 11 having a first shaping surface in which the surface roughness Ra of a peripheral section 13b coming in contact with a molten glass for the first time after the starting of the pressing process is made larger than the surface roughness Ra of a central part 13a coming in contact with the molten glass before the starting of the pressing process.

(Molten Glass Supplying Process)

Figure 4A:
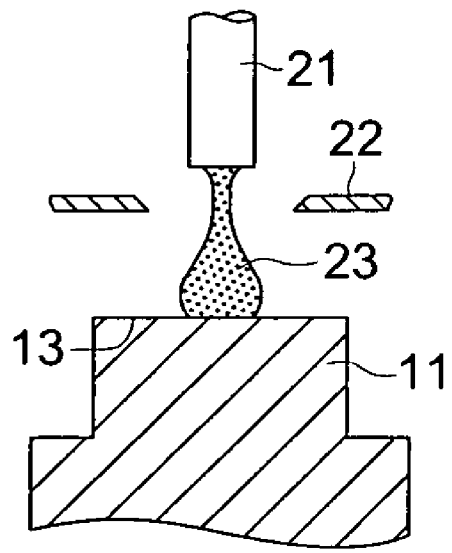
FIGS. 4a and 4b are schematic diagrams showing a lower mold 11 and a molten glass 23 in a molten glass supplying process.
Figure 4B:
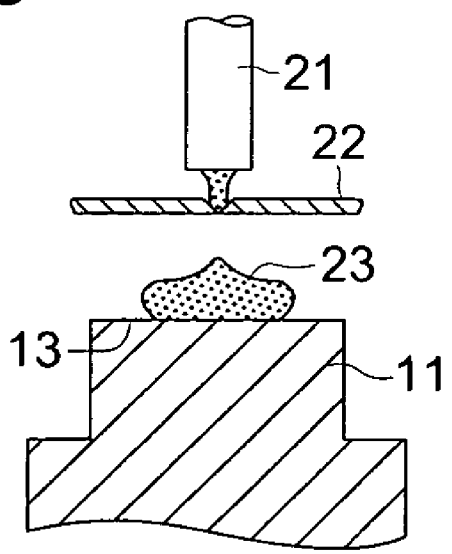

A molten glass supplying process is a process of supplying a molten glass to the first shaping surface formed on the lower mold. FIG. 4 is a schematic diagram showing a lower mold 11, a molten glass 23 and the like in the molten glass supplying process. First, a molten glass 23 is made to flow out from an outflow nozzle 21, and is supplied to the lower mold 11 (FIG. 4(a)). Then, if an outflow amount of the molten glass reaches a predetermined amount, a flow of the molten glass 23 is cut with a blade 22 and the molten glass 23 is separated from the outflow nozzle 21 (FIG. 4(b)). The molten glass 23 supplied in the molten glass supplying process is brought in contact with the central section 13a of the first shaping surface 13, and cooling is mainly started by heat releasing from there.

The lower mold 11 is heated beforehand to a predetermined temperature. There is no specific restriction in a temperature of the lower mold 11, and the temperature of the lower mold 11 may be determined suitably depending on the kind of glass, the size of a glass substrate and the like. If the temperature of the lower mold 11 is too low, there are problems that the flatness of a glass substrate gets worse and wrinkles takes place on a transfer surface. On the contrary, if the temperature is made too high more than needed, it is not desirable, because the welding of the shaping surface with glass occurs or the deterioration of the lower mold becomes noticeable. Usually, it is desirable to make the temperature within about a temperature range of from (Tg (glass transition point) of a shaped glass $-200°$ C.) to (Tg$+100°$ C.).

There is also no specific restriction in a heating section for the lower mold 11, and it can be selected suitably from well-known heating devices. For example, a cartridge heater which is used by being embedded in the inside of the lower mold 11, a sheet-shaped heater which is used by being brought in contact with the outside of the lower mold 11, and the like can be employed. Further, it can also be heated by the use of an infrared heating device and a high frequency induction heating device.

(Pressing Process)

The pressing process is a process of cooling a molten glass supplied to the first shaping surface 13 while pressing the molten glass between the first shaping surface 13 and the second shaping surface 14 formed on the upper mold 12, whereby a glass substrate 24 is obtained.

Figure 5:
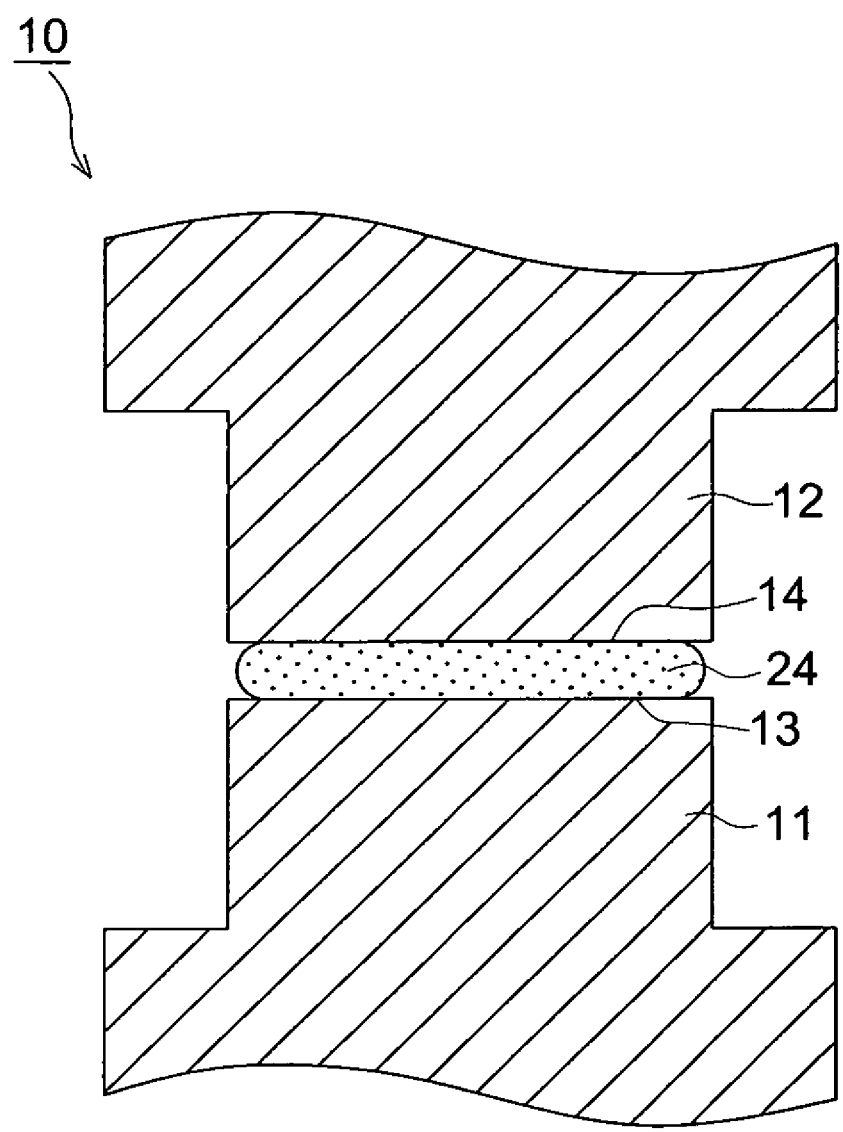
FIG. 5 is a schematic diagram showing a glass substrate shaping mold 10 and a glass substrate 24 in a pressing process.

FIG. 5 is a schematic diagram showing a glass substrate shaping mold 10 and a glass substrate 24 in the pressing process. In the molten glass supplying process, the lower mold 11 to which the molten glass 23 is supplied is shifted horizontally to a position opposite to the upper mold 12. Then, the molten glass is pressed between the first shaping surface 13 of the lower mold 11 and the second shaping surface 14 of the upper mold 12. The molten glass spreads by being pressed and is brought also in contact with the peripheral section 13b of the first shaping surface 13. The molten glass releases heat through the contact surface with the first shaping surface 13 and the second shaping surface 14, whereby the molten glass is cooled and solidified and is made to a glass substrate 24.

As mentioned above, the producing method of the present invention employs a mold in which on the first shaping surface 13, the surface roughness Ra of the peripheral section 13b adapted to come in contact with a molten glass for the first time after the starting of a pressing process is made larger than the surface roughness Ra of the central section 13a adapted to come in contact with the molten glass before the starting of the pressing process. Therefore, the heat releasing rate from the peripheral section of the first shaping surface becomes higher than the heat releasing rate from the central section. As a result, at the time point (t3) when the temperature of a central portion of a molten glass reaches to T2, a difference of temperature ($\Delta$T) between the central and peripheral sections can be made small, whereby a glass substrate having a high flatness can be obtained.

Here, the upper mold 12 is heated to a predetermined temperature in the same way as the lower mold 11. The heating temperature and the heating section are the same as those in the case of the above-mentioned lower mold 11. However, the heating temperature may be the same as or may be different from that of the lower mold 11.

As a pressing section to press a molten glass by applying a load onto the lower mold 11 and the upper mold 12, a well-known pressing device is suitably selected and used. For example, an air cylinder, an oil pressure cylinder, an electric cylinder using a servomotor and the like may be employed.

(Producing Method of a Glass Substrate 30 for an Information Recording Medium)

Figure 6A:
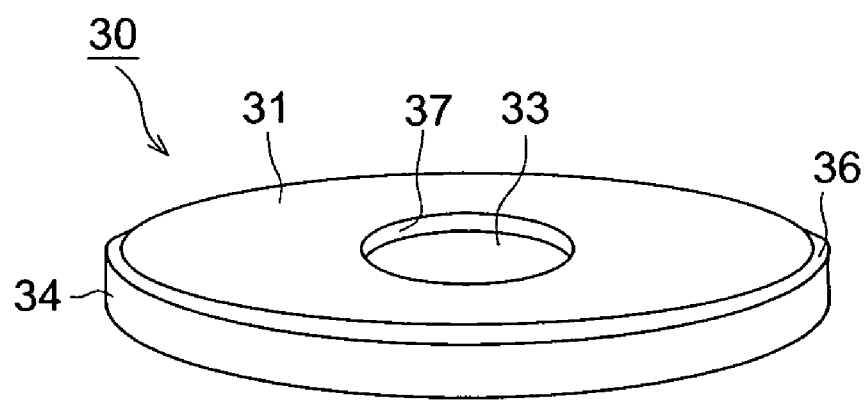
FIGS. 6a and 6b are perspective and cross-sectional views showing one example of a glass substrate for an information recording medium produced by the producing method of a glass substrate for an information recording medium according to the present invention.
Figure 6B:
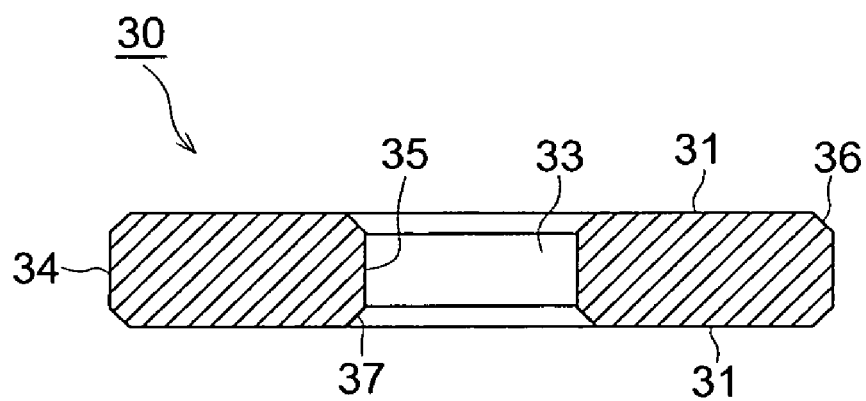

A glass substrate for an information recording medium can be produced by a technique to add at least a polishing process to a glass substrate (blank material) produced by the above-mentioned producing method. FIG. 6 is an illustration showing one example of a glass substrate 30 for an information recording medium produced by the producing method of a glass substrate 30 for an information recording medium according to the present invention. FIG. 6(a) is a perspective view and FIG. 6(b) is a cross sectional view. The glass substrate 30 for an information recording medium is a disk-shaped glass substrate in which a central hole 33 is formed, and the disk-shaped glass substrate has a main surface 31, an outer peripheral edge surface 34, and an inner peripheral edge surface 35. Chamfered corners 36 and 37 are formed on the outer peripheral edge surface 34 and the inner peripheral edge surface 35, respectively.

A polishing process is a process of polishing a main surface of a produced glass substrate (blank material), and is a process of finishing finally the glass substrate so as to have a smoothness required as a glass substrate for an information recording medium. As a polishing method, a well-known method used as a producing method of a glass substrate for an information recording medium can be used as it is. For example, two pads are pasted on faces of two rotatable machine platens such that the two pads face to each other, and a glass substrate is arranged between the two pads. In the above arrangement, the two pads are rotated while being in contact with the surfaces of the glass substrate and simultaneously a polishing agent is fed onto the surfaces of the glass substrate, whereby a polishing process is conducted. Further, it is also desirable to separate the polishing process into plural processes, such as a rough polishing process and a precise polishing process by changing the grain size of a polishing agent and the kind of pads.

As a polishing agent, for example, cerium oxide, zirconium oxide, aluminium oxide, manganese oxide, colloidal silica, diamond, and the like may be employed. Among the above agents, it may be preferable to use cerium oxide, because since it has a high reactivity with glass, a smooth polished surface can be obtained for a short time by the use of it.

Although the pad can be separated into a hard pad and a soft pad, a pad can be chosen suitably and can be used as required. As a hard pad, a pad made from a material, such as a hard velour, a urethane foaming, a pitch containing suede, and the like may be employed, and as a soft pad, a pad made from a material, such as suede, velour, and the like may be employed.

Further, in the producing method of a glass substrate for an information recording medium according to the present invention, it is desirable to conduct an inner and outer periphery treating process and a lapping process in addition to a polishing process to polish a main surface of a glass substrate (blank material). The inner and outer periphery treating process is a process of conducting a process of piercing a central hole, a grinding process to secure the shape of an outer peripheral edge surface and an inner peripheral edge surface and a dimensional accuracy and a polishing processing for an inside and outside peripheral edge surfaces. The lapping process is a process of conducting a lapping process before a polishing process in order to satisfy the flatness of a plane on which a recording layer is formed, thickness, parallel accuracy, and the like. Furthermore, in the case of employing a chemically strengthened glass or a crystallized glass as a material of a glass substrate, a chemically strengthening process to conduct ion exchange by immersing a glass substrate in a heated chemically strengthening treatment liquid, a crystallizing process to conduct crystallizing by a heat treatment and the like can be conducted suitably if needed. Each process of the inner and outer peripheral treating process, the lapping process, the chemically strengthening process, and the crystallizing process can be conducted b a method having been used usually as a producing method of a glass substrate for an information recording medium.

Here, in the producing method of a glass substrate for an information recording medium according to the present invention, various processes other than the above may be conducted. For example, an annealing process to conduct a heat treatment to ease an internal strain of a glass substrate, a heat shock process to confirm the reliability of the strength of a glass substrate, a cleaning process to remove foreign matters, such as a polishing agent and a chemically strengthening treatment liquid which remains on the surface of a glass substrate, various inspection and evaluation processes, and the like may be conducted.

There is no specific restriction in the material of a glass substrate, and materials capable of being used as a material of a glass substrate for an information recording medium can be chosen suitably and can be used. Among the materials, a chemically strengthened glass and a crystallized glass are especially desirable, because they are excellent in shock resistance and resistance to vibration. As a glass material capable of being chemically strengthened, for example, soda lime glass composed of $SiO_2$, $Na_2O$, and $CaO$ as principal components; aluminosilicate glass composed of $SiO_2$, $Al_2O_3$, $R_2O$ (R=K, Na, Li) as principal components; borosilicate glass; $Li_2O$—$SiO_2$ system glass; $Li_2O$—$Al_2O_3$—$SiO_2$ system glass; R'O—$Al_2O_3$—$SiO_2$ system glass (R'=Mg, Ca, Sr, Ba) and the like can be employed.

There is also no specific restriction in the size of a glass substrate. For example, glass substrates with outside diameters of various sizes, such as 2.5 inches, 1.8 inches, 1 inches, and 0.8 inches may be employed. Further, there is also no specific restriction in the thickness of a glass substrate. For example, glass substrates with various thickness, such as 1 mm, 0.64 mm, and 0.4 mm may be employed.

(Producing Method of an Information Recording Medium)

An information recording medium can be produced by forming at least a recording layer in a glass substrate for an information recording medium according to the present invention. The recording layer is not limited specifically so that various recording layers utilizing characters, such as magnetism, light, magneto optical, and the like can be used.

Especially, it is suitable to use a magnetic layer as the recording layer for producing an information recording medium (magnetic disk).

As magnetic materials used for a magnetic layer, there is no specific restriction, and well-known materials can be chosen suitably and can be used. For example, magnetic materials containing Co as a principal component, such as CoPt, CoCr, CoNi, CoNiCr, CoCrTa, CoPtCr, CoNiPt, CoNiCrPt, CoNiCrTa, CoCrPtTa, CoCrPtSiO, and the like may be used.

As a magnetic layer, employed is a granular with a structure in which magnetic particles, such as Fe, Co, CoFe, and CoNiPt, are dispersed into a nonmagnetic layer composed of a ferrite system material, an iron-rare earth system material, $SiO_2$, BN or the like in addition to the above-mentioned Co system material. Magnetic layers may be any one of an in-plane type and vertical type.

As a method of forming a magnetic layer, a well-known method can be employed. For example, a sputtering method, a non-electrolytic plating method, a spin coat method, and the like are listed.

The magnetic disk may be further provided with a foundation layer, a protective layer, a lubricating layer, and the like as needed. For each of these layers, well-known materials are suitably chosen and can be used. As materials of a foundation layer, for example, Cr, Mo, Ta, Ti, W, V, B, Al, Ni and the like can be used. As materials of a protective layer, for example, Cr, a Cr alloy, C, ZrO2, SiO2 and the like are listed. Further, as a lubricating layer, employed are, for example, materials coated with a liquid lubricant composed of perfluoropolyether (PFPE) and subjected to heat treatment if needed.

EXAMPLE

Examples 1-6

As a glass substrate shaping mold, prepared were molds in which the surface roughness Ra of a central section of a first shaping surface of a lower mold was 0.1 μm, and the surface roughness Ra of the peripheral section was 0.12 μm (in Example 1), 0.15 μm (in Example 2), 0.5 μm in Example 3), 1 μm (in Example 4), 2 μm (in Example 5), and 3 μm (in Example 6). The adjustment of the surface roughness Ra was conducted by a technique to adjust the degree of abrasive grain of a grinding stone of a grinding process. Here, on the first shaping surfaces, a region located at an inside of a circle with a diameter of 35 mm was made as a central section and a region located at an outside of a circle was made as a peripheral section. As materials of an upper mold and a lower mold a super hard steel (M45: made by Toshiba Tungaloy CO., LTD., Heat conductivity: 42 W/m·K) was used.

Both the lower mold and the upper mold were heated to 400° C. and a molten glass was supplied to the first shaping surface of the lower mold. Thereafter, a pressing shaping process was conducted between the first shaping surface of the lower mold and the second shaping surfaces of an upper mold. As a glass material, a borosilicate glass was used. After the molten glass was pressed for 5 seconds between the upper and lower molds, one of the upper and lower molds was opened, and a glass substrate was collected. The outside diameter of the glass substrate was about 70 mm and the thickness of the glass substrate was about 1 mm.

Then, the flatness of the obtained glass substrate was measured. The flatness was measured with an interferometer and was represented with a PV value of an amount of deviation from an ideal flat surface. The judgment of flatness was made in such a way that a flatness of 10 μm or less was judged as "very good" (Judgment: A), and a flatness of more than 10 μm and 20 µm or less was judged as "good" (Judgment: B). On the other hand, in the case that a flatness was more than 20 µm, since it takes a lot of time and labor to conduct a post processing to produce a glass substrate for an information recording medium, a flatness of more than 20 µm was judged as "with a problem" (Judgment: C). Here, the judgment was conducted by an average value obtained from the measurement values of the flatness of ten glass substrates.

The results are shown in Table 1. The flatness in any one of Examples 1 to 6 was 20 µm or less, therefore, the test results were good. Especially, in Examples 2 to 5 in which the surface roughness Ra of the peripheral section of the first shaping surface is 1.5 or more times and 20 or less times of the surface roughness Ra of the central section, the flatness of any one of them was 10 µm or less and evaluated as "very good".

TABLE 1

| | Surface roughness Ra of a peripheral section 13b of a first shaping surface (µm) | Surface roughness Ra of a central section 13a of a first shaping surface (µm) | Flatness of a glass substrate (µm) | Judgment |
|---|---|---|---|---|
| Comparative example 1 | 0.05 | 0.1 | 32 | C |
| Comparative example 2 | 0.1 | 0.1 | 23 | C |
| Inventive example 1 | 0.12 | 0.1 | 14 | B |
| Inventive example 2 | 0.15 | 0.1 | 8 | A |
| Inventive example 3 | 0.5 | 0.1 | 7 | A |
| Inventive example 4 | 1 | 0.1 | 5 | A |
| Inventive example 5 | 2 | 0.1 | 6 | A |
| Inventive example 6 | 3 | 0.1 | 12 | B |

Comparative Examples 1 and 2

The shaping and evaluation of a glass substrate were conducted in the same way as in Examples 1 to 6 except that the surface roughness Ra of the peripheral section of the first shaping surface of a lower mold was made 0.05 µm (in Comparative example 1) and 0.1 µm (in Comparative example 2). The results of Comparative examples 1 and 2 are shown in Table 1 together with the results of Examples 1 to 6.

The flatness of each of Comparative examples 1 and 2 exceeded 20 µm and a good glass substrate was not obtained.

Examples 7-10

As a glass substrate shaping mold, prepared were molds in which the surface roughness Ra of a central section of a first shaping surface of a lower mold was 1 µm, and the surface roughness Ra of the peripheral section was 1.3 µm (in Example 7), 1.5 µm (in Example 8), 2 µm (in Example 9), and 5 µm (in Example 10). As materials of an upper mold and a lower mold, a carbon ceramic (BS11509: made by Kogi Corporation, Heat conduction: 67 W/m·K) was used. The shaping and evaluation of a glass substrate were conducted in such a way that the other conditions were made on the same conditions as Examples 1 to 6. The results are shown in Table 2.

TABLE 2

| | Surface roughness Ra of a peripheral section 13b of a first shaping surface (µm) | Surface roughness Ra of a central section 13a of a first shaping surface (µm) | Flatness of a glass substrate (µm) | Judgment |
|---|---|---|---|---|
| Comparative example 3 | 0.5 | 1 | 30 | C |
| Comparative example 4 | 1 | 1 | 22 | C |
| Inventive example 7 | 1.3 | 1 | 13 | B |
| Inventive example 8 | 1.5 | 1 | 8 | A |
| Inventive example 9 | 2 | 1 | 6 | A |
| Inventive example 10 | 5 | 1 | 5 | A |

The flatness in any one of Examples 7 to 10 was 20 µm or less and were evaluated as "good". Especially, the flatness of any one of Examples 8 to 10 was 10 µm or less and were evaluated as "very good".

Comparative Examples 3 and 4

The shaping and evaluation of a glass substrate were conducted in the same way as in Examples 7 to 10 except that the surface roughness Ra of the peripheral section of the first shaping surface of a lower mold was made 0.5 µm (in Comparative example 3) and 1 µm (in Comparative example 4). The results of Comparative examples 3 and 4 are shown in Table 2 together with the results of Examples 7 to 10.

The flatness of each of Comparative examples 3 and 4 exceeded 20 µm and a good glass substrate was not obtained.

The invention claimed is:

1. A method of producing a glass substrate by press-shaping molten glass, the method comprising:
   supplying molten glass to a first shaping surface formed on a lower mold;
   cooling the molten glass supplied onto the first shaping surface while pressing the molten glass between the first shaping surface and a second shaping surface formed on an upper mold so that the molten glass is shaped into a glass substrate;
   wherein the first shaping surface includes a central section adapted to contact the molten glass before the molten glass is pressed, and includes a peripheral section adapted to contact the molten glass after the molten glass has been pressed; and
   wherein a surface roughness of a peripheral section is greater than a surface roughness of the central section and the molten glass in contact with the greater surface roughness of the peripheral section has a cooling rate faster than the molten glass in contact with the central section, such that the solidification timing of the molten glass in the central and peripheral sections is equalized.

2. The method described in claim 1, wherein the surface roughness of the central section is 0.05 to 3.00 µm and the surface roughness of the peripheral section is 0.07 to 10.00 µm.

3. The method described in claim 1, wherein the surface roughness of the peripheral section is 1.5 to 20 times of the surface roughness of the central section.

4. The method described in claim 1, wherein the glass substrate is a glass substrate for producing a glass substrate for an information recording medium.

5. The method of claim 1, wherein each of the first shaping surface and the second shaping surface is a flat surface.

6. A method of producing a glass substrate for an information recording medium, comprising:

polishing the glass substrate produced by the method described in claim 1.

7. A method of producing an information recording medium, comprising:

forming a recording layer on the glass substrate produced by the method described in claim 6.

8. The method of claim 1, wherein the surface roughness of the peripheral section is determined such that the glass substrate has a flatness of 20 μm or less.

9. The producing method described in claim 8, wherein the flatness is 10 μm or less.

* * * * *